United States Patent
Kalogeropoulos et al.

(10) Patent No.: US 6,337,560 B1
(45) Date of Patent: Jan. 8, 2002

(54) LIFE CYCLE CHARGING FOR BATTERIES

(75) Inventors: Sarandis Kalogeropoulos, Malmö; Jan-Olof Svensson, Landskrona, both of (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/722,884

(22) Filed: Nov. 28, 2000

(51) Int. Cl.$^7$ .................................................. H02J 7/00
(52) U.S. Cl. ........................................ 320/160; 320/125
(58) Field of Search ................................ 320/160, 125, 320/130, 162

(56) References Cited

U.S. PATENT DOCUMENTS

| | | |
|---|---|---|
| 5,528,121 A | 6/1996 | Okamura |
| 5,631,533 A | 5/1997 | Imaseki |
| 5,939,864 A | 8/1999 | Lenhart et al. |
| 6,011,380 A * | 1/2000 | Paryani et al. ............ 320/132 |

OTHER PUBLICATIONS

Copy of U.S. application No. 09/397,001, filed Sep. 15, 1999.
European Standard Search Report, *Date of Completion:* Jun. 19, 2001; *Date of Mailing:* Jun. 25, 2001.

* cited by examiner

Primary Examiner—Gregory J. Toatley, Jr.
(74) *Attorney, Agent, or Firm*—Burns, Doane, Swecker & Mathis, L.L.P.

(57) ABSTRACT

A method and apparatus for extending the cycle life of a battery by using different charge voltages or different current cut-offs to recharge the battery during the course of the battery's life. The capacity of a battery is gradually depleted as the battery is repeatedly charged and discharged. The rate at which the battery capacity is depleted varies in accordance to the charge voltage, or the current cut-off, used to recharge the battery. For example, higher charge voltages cause the capacity to be more rapidly depleted than lower charge voltages. A battery may be charged using a high charge voltage, e.g., its rated charge voltage, during periods of expected high usage. To extend the battery's cycle life, the battery may be charged using a low charge voltage during periods of expected low usage.

31 Claims, 9 Drawing Sheets

LIFE CYCLE CHARGING FOR BATTERIES

RELATED APPLICATION

This application is related to U.S. application Ser. No. 09/397,001 now U.S. Pat. No. 6,194,874 entitled "System and Method for Maintenance Charging of Battery Cells" filed on Sep. 15, 1999, the disclosure of which is expressly incorporated herein by reference, in its entirety.

BACKGROUND

The present invention pertains to battery cell charging methods and systems. More particularly, the present invention relates to the maintenance charging of lithium-based battery cells, including, for instance, lithium-ion battery cells and lithium-polymer battery cells.

The increasing popularity of consumer electronics in conjunction with the miniaturization of electronic circuits has given rise to a great number of devices which are battery operated. Portable electrical devices including mobile phones, laptop computers, video cameras, and the like, typically rely upon one or more battery cells for electrical power.

Since batteries have a limited capacity, they must periodically be connected to an external charger to be recharged. The conventional units for measuring the capacity of a battery cell are Milliamp Hours (mAh). That is, the dimensional units of mAh are used as a standard measurement for defining the potential power rating, or capacity, of a battery cell. Higher mAh ratings for a battery correlate to longer usage periods for the electronic device being powered by the battery, e.g., a longer talk time and/or standby time for a cellular phone or usage time for a notebook computer.

A number of different types of battery cells are presently in use as power supplies in portable electronic devices. Among the most widespread type of batteries are, nickel-cadmium (Ni—Cd), sealed lead acid (SLA), nickel-metal-hydride (NiMH), and, more recently, lithium-ion (Li-ion) and lithium-polymer (Li-polymer). Each of these battery technologies may be characterized by relative advantages and disadvantages.

Ni—Cd batteries are a commonly used type of battery cells which are often found in devices requiring relatively large amounts of current (e.g., as required by an electric drill). A primary advantage of Ni—Cd battery technology is cost, since Ni—Cd batteries tend to be the least expensive type of battery cells. A major disadvantage of Ni—Cd battery cells is the "memory effect," also known as "voltage depression," which effectively reduces the cell's capacity if the battery cell is not fully discharged before re-charging. A battery cell impaired by the memory effect appears to be fully charged but lasts only a short time. The memory effect may sometimes be ameliorated by subjecting the battery to a repetitive series of charges and discharges.

Ni—MH batteries, a more recent technology than Ni—Cd batteries, have attained recent popularity for use in cellular telephones, laptop computers, camcorders, camera flash devices, and like portable consumer electronics devices. Ni—MH batteries have a higher charge capacity per unit of weight than Ni—Cd batteries, but tend to be more expensive. A major advantage of Ni—MH batteries is that they are virtually free of the memory effect which plagues Ni—Cd batteries. It is not necessary to fully discharge a Ni—MH battery prior to recharging it. However, Ni—MH batteries can be damaged by overheating which may occur if the battery is overcharged.

Li-ion batteries have recently gained commercial popularity. Li-ion battery cells typically have a lithium-metal-oxide compound for the positive electrode (the cathode) and a carbon-based compound for the negative electrode (the anode). The Li-ion battery cell becomes charged and discharged as lithium ions migrate between the cathode and the anode, exchanging electrons through doping and de-doping. In short, the migration of electrons produces an electrical current. Li-ion batteries are advantageous over nickel-based batteries in certain respects. For example, Li-ion battery systems have a much higher energy density, as a function of mass. Therefore, for battery systems of equal charge capacities, Li-ion battery systems tend to be lighter and longer lasting than nickel-based battery systems. Another significant advantage of Li-ion battery technology is that Li-ion battery cells do not have the memory effect that exists in other types of nickel-based battery cells, particularly Ni—Cd cells.

Li-polymer batteries are another recent entrant in the rechargeable battery market. Li-polymer batteries may be designed to be very thin, and even exhibit some flexibility. Li-polymer batteries are fairly high cost, relative to non-lithium battery technologies.

Another battery technology worth noting in addition to the aforementioned types of batteries are the sealed lead-acid (SLA) batteries. SLA batteries, which are based on well known lead-acid battery technology, are fairly low cost as compared to the other types of batteries mentioned. SLA batteries tend to be heavy, and are often too cumbersome for portable applications.

A conventional mode of charging a Li-ion battery cell involves a two-phase charging process. The charger begins with a charging phase of constant current, and then completes the charging process at a constant voltage. Such a two-phased charging process is termed "constant-current, constant-voltage" ("CC-CV") charging. Conventionally, in the first phase of the charging process, a constant current is applied to the Li-ion battery until the cell approaches its maximum voltage. In the second phase, a constant voltage equal to the maximum cell voltage is applied to the battery until the charge current has decreased to a current cut-off value (e.g., 50 mA, 75 mA, 30 mA). The current cut-off value is an indication of a fully charged battery.

Li-ion batteries have a useful life that typically lasts anywhere from 200 to 1000 charge cycles. Each time a battery is fully charged to its maximum voltage, the useful life of the battery is reduced. It would be useful if the cycle life, that is, the number of charge/recharge cycles, of a battery could be increased. This would extend the useful life of the battery.

SUMMARY

Due to the aforementioned drawbacks of conventional charging systems, there is a need in the art for a system and method of charging battery cells so as to extend the useful life of the battery. The present invention utilizes novel charging techniques to address this need by reducing the rate at which the battery capacity diminishes due to repeated charging.

There is also a need for a Li-ion battery charging system and method which does not require additional charging circuitry or logic hardware (i.e., specialized charger logic) which would result in additional cost, weight and volume within a portable battery operated device.

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

An exemplary embodiment of the present invention involves a method of charging a battery in which the battery is repeatedly charged using a first charge voltage during a first time period, and then repeatedly charged using a second charge voltage during a second time period. The second charge voltage is different from the first charge voltage and the second charge voltage diminishes the battery's capacity at a different rate than the first charge voltage.

Another exemplary embodiment of the present invention involves a method of charging a battery. A determination is made of a first number of cycles during which the battery capacity diminishes by a first amount, a first charge voltage being used to charge the battery. A determination is then made of a second number of cycles during which the capacity of the battery diminishes by a second amount, a second charge voltage being used to charge the battery. The battery is repeatedly charged using said first charge voltage until the battery capacity has diminished by said first amount, and then the battery is repeatedly charged using the second charge voltage. In accordance with a preferred embodiment, the first charge voltage is lower than the second charge voltage. In an alternative embodiment, the first charge voltage could be higher than the second charge voltage.

Another exemplary embodiment of the present invention involves a method of charging a rechargeable battery of a device. In accordance with this exemplary method an expected usage profile for the device is accessed which identifies periods of expected high usage and periods of expected low usage for the device. A charge voltage adjustment scheme is developed based upon the expected usage profile. The battery is then charged to a higher first charge voltage during periods of expected high usage, and charged to a lower second charge voltage during periods of expected low usage.

An exemplary embodiment of the present invention involves a battery charging system which has a variable charge voltage battery charger and a charge voltage decision logic that determines whether a battery is to be charged using a first charge voltage or a second charge voltage. The charge voltage decision logic controls the battery charger to repeatedly charge the battery using the first charge voltage during a first period and using the second charge voltage during a second period. The second charge voltage diminishes the battery capacity at a different rate than the first charge voltage.

Another exemplary embodiment of the present invention involves a battery charging system which has a charge controller, a battery charger, a capacity measurement section, and a logic section that repeatedly charges the battery using a first charge voltage until said capacity measurement section determines that a battery capacity has diminished by a first amount, and uses a second charge voltage. The first charge voltage is higher than the second charge voltage in accordance with this embodiment.

Another exemplary embodiment of the present invention involves a battery charging apparatus which has battery charging circuitry and a controller. The controller controls the battery charger such that is repeatedly charges the battery using a first charge voltage during a first period and using a second charge voltage during a second period of the battery's cycle life. The second charge voltage is different from the first charge voltage, and the second charge voltage diminishes the battery capacity at a different rate than the first charge voltage.

Another exemplary embodiment of the present invention involves a battery charging apparatus for charging a battery which is repeatedly charged and discharged. In accordance with this exemplary embodiment the battery charger has battery charging circuitry and a controller. The controller causes the battery charging circuitry to charge the battery using a first charge voltage until the controller determines that the battery capacity has diminished by a first amount. Then the controller causes the battery charging circuitry to charge the battery using a second charge voltage until the controller determines that the capacity has diminished by a second amount. In accordance with a preferred embodiment, the first charge voltage is lower than the second charge voltage. In an alternative embodiment, the first charge voltage could be higher than the second charge voltage.

Another exemplary embodiment of the present invention involves a battery charging apparatus which has battery charging circuitry, a controller; and a battery usage database which contains an expected usage profile for the device. The controller accesses the expected usage profile for the device, develops a charge voltage adjustment scheme based upon the expected usage profile, and causes the battery charging circuitry to charge the battery to a first charge voltage during periods of expected high usage and charge the battery to a second charge voltage during periods of expected low usage. In accordance with this embodiment, the first charge voltage is higher than the second charge voltage.

In alternative embodiments of the present invention the current cut-off is adjusted instead of, or in addition to, adjusting the charge voltage.

BRIEF DESCRIPTION OF THE DRAWINGS

These, and other objects, features and advantages of the present invention will become more readily apparent to those skilled in the art upon reading the following detailed description, in conjunction with the appended drawings, in which.

DETAILED DESCRIPTION

These and other aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

Figure 1:
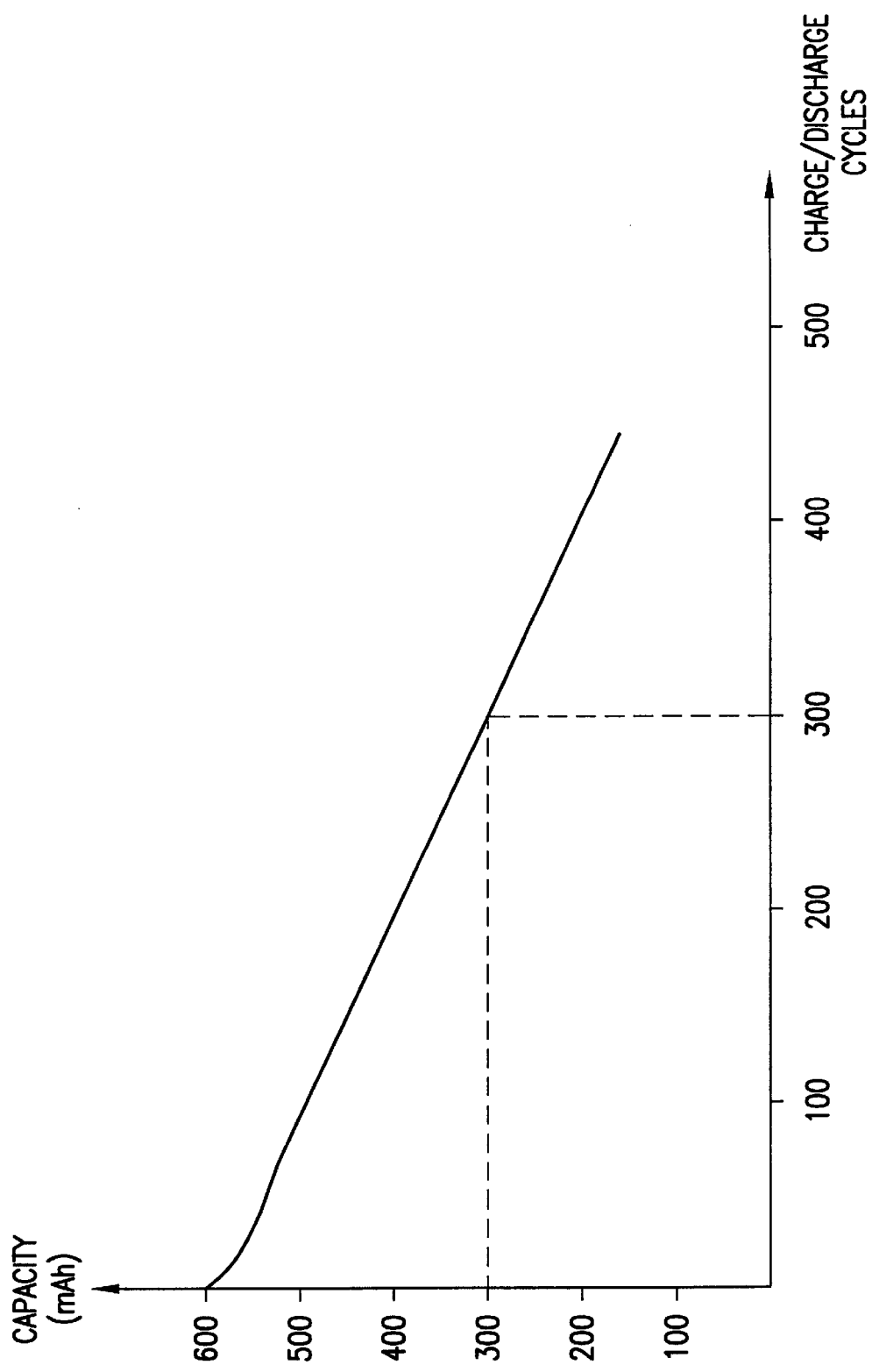
FIG. 1 depicts the cycle life capacity of a rechargeable battery repeatedly charged to full capacity at its rated charge voltage.

FIG. 1 depicts the cycle life capacity of a rechargeable battery repeatedly charged to full capacity at its rated charge voltage. This figure illustrates an exemplary relationship between battery capacity, in milliamp hours (mAh), and the number of charge/discharge cycles over the cycle life of the battery. As shown in the figure, the battery's capacity diminishes over the life of the battery due to repeated charging and discharging.

As used herein, the term capacity is defined herein to be the amount of energy that can be withdrawn from a filly charged cell or battery under specified conditions, that is, the battery's store of electrical energy. The capacity of a battery may be determined during the course of the battery's life by measuring the amount of energy discharged from a fully charged battery to its discharged state, by measuring the amount of energy that a battery accepts while it is being charged, or by other like means of determining the capacity known to those of skill in the art.

A battery may be characterized by a rated charge voltage which is generally defined in the specifications provided by the manufacturer of the battery. The rated charge voltage, which may also be referred to as the specified maximum charging voltage, is the maximum recommended voltage for charging the battery. The rated charge voltage depends upon the battery chemistry and other design parameters of the battery. The exemplary relationship of FIG. 1 reflects a battery being repeatedly charged to that rated charge voltage. For the example depicted in FIG. 1, the battery is designed to have a rated charge voltage of 4.2 volts, and a cut-off current of, for instance, 50 mA.

As a battery is repeatedly charged and discharged over the life of the battery, the battery's capacity gradually diminishes. In general, the rate at which a battery's capacity diminishes varies over the cycle life of a battery. The capacity diminishes at a faster rate when the battery is new. When a battery is repeatedly charged to full capacity at its rated charge voltage, the battery's capacity typically diminishes at a gradual exponential rate during the first portion of its life. This can be seen in FIG. 1 at the beginning of the battery's life, e.g., for the first 50 cycles. After an initial number of cycles, the rate at which capacity diminishes for each cycle levels off to be more or less linear. That is, the capacity does not decrease as fast after having gone through a number of charge/discharge cycles at the beginning of the battery's life. At some point after quite a number of cycles (e.g., 300 cycles), the battery capacity falls below an acceptable capacity level. At this point, the battery is said to be at the end of its useable life.

In regard to the useable life of a battery, it will be appreciated that the length of the usable life, or cycle life, depends largely upon the level of capacity that is acceptable for a given application. As such, the definition of usable life is somewhat arbitrary in that it depends upon the purpose for which the battery is to be used. For some purposes (e.g., a cellular telephone), a battery may be acceptable so long as the capacity is above a certain amount. Other purposes (e.g., for use in an aircraft's black box) may be such that a larger value of capacity is required for the battery to be considered acceptable.

Figure 2:
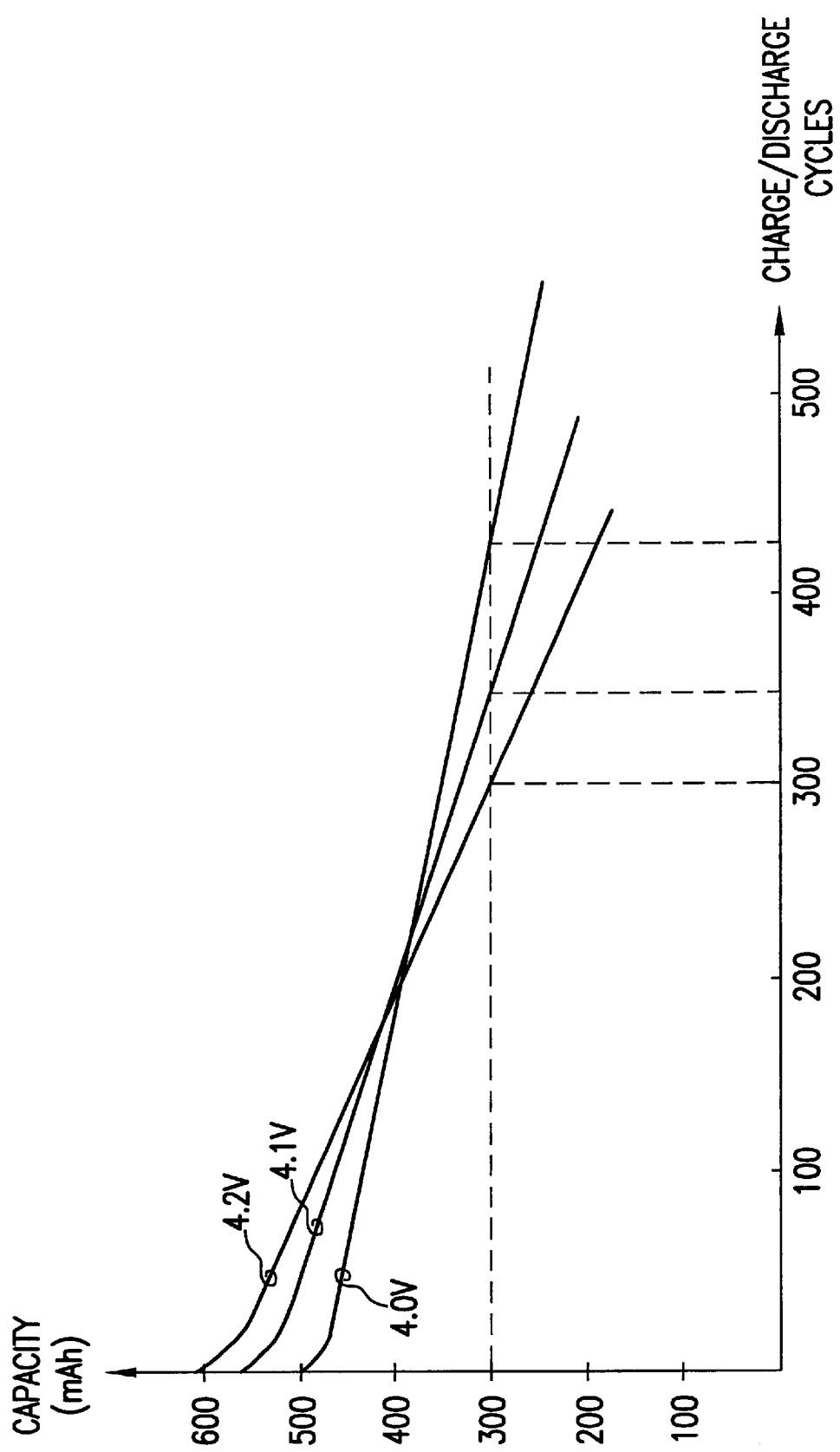
FIG. 2 depicts the effect on cycle life of using various charging voltages for a given battery.

FIG. 2 depicts the effect on cycle life of using various charging voltages for a given battery. The exemplary relationship illustrated in FIG. 2 involves a battery designed to have a rated charge voltage of 4.2 volts and a rated cut-off current of 50 mA. For illustrative purposes, the cycle life curves are also shown for the same battery being charged to 4.1 volts and 4.0 volts. The present invention may be used with batteries and battery technologies which have various other charge voltages and current cut-off values.

As shown in the figure, a battery which is repeatedly recharged at its rated charge voltage has a shorter cycle life than the battery would have if repeatedly charged to a lesser voltage. In other words, using a reduced charge voltage increases the cycle life of the battery. This is because the capacity of a battery diminishes more rapidly over the cycle life of the battery when the battery is charged to its full rated charge voltage, than for the same battery charged to a lesser voltage. As the charging voltage decreases, the cycle life of a given battery tends to increase.

It should be noted, however, that a battery charged using a reduced charging voltage initially has a smaller capacity than a battery charged to a relatively higher voltage. This can be seen for the first few cycles of the three cycle life curves of FIG. 2. After a number of charge/discharge cycles, the capacity associated with the lower charge voltage is actually greater than the capacity associated with the higher charge voltage. For example, FIG. 2 shows that after 300 cycles, the capacity associated with the 4.0 volt charge voltage is greater than the capacity associated with the 4.1 volt charge voltage, which in turn, is greater than the capacity associated with the 4.2 volt charge voltage. This occurs because the capacity diminishes more rapidly over the cycle life of a battery for higher charge voltages than for lower charge voltages.

Figure 3:
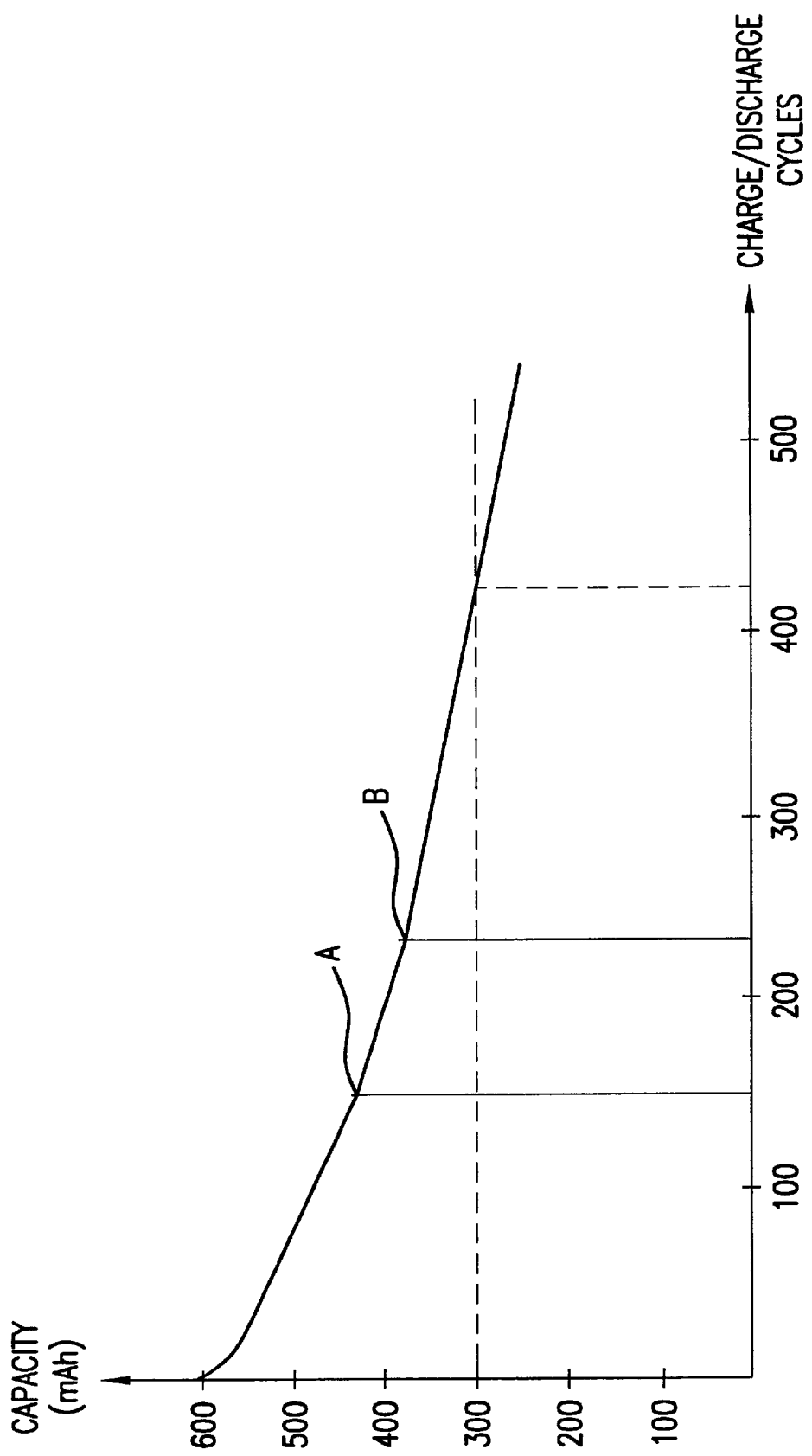
FIG. 3 depicts an exemplary cycle life capacity relationship for a first embodiment of the present invention, wherein the life cycle of a battery is extended by changing the charging voltage during the life of the battery.

FIG. 3 depicts an exemplary cycle life capacity relationship for a first embodiment of the present invention, wherein the life cycle of a battery is extended by changing the charging voltage during the life of the battery. In accordance with this first embodiment, the initial charging voltage is chosen to be the rated charge voltage of the battery. At certain points during the life of the battery, the charge voltage is adjusted downward to a lesser charge voltage.

In the exemplary first embodiment depicted in FIG. 3, the battery is initially charged to its rated charge voltage of 4.2 volts. Later in the cycle life of the battery, the charge voltage is altered such that the battery is charged to a lesser voltage of 4.1 volts. Finally, the charge voltage is set to be 4.0 volts. The value of the various charge voltages and the number of times the charge voltages are changed (e.g., from 4.2 to 4.1 and finally to 4.0 volts) have been chosen in this disclosure for the sake of illustration. The invention is not limited to these particular voltages, nor is the invention limited to having three different charge voltages. In accordance with the present invention, the number of times the charge voltage is changed and the amount of the charge voltage may be chosen to conform to a particular situation or to meet an objective. Furthermore, the charge voltages may be adjusted upward, downward, or varied up and down in combination, as discussed below for alternative embodiments.

In accordance with alternative embodiments, charging parameters other than the charge voltage may be varied during different periods in order to extend the battery cycle life. For example, the current cut-off may be adjusted instead of, or in addition to, adjusting the charge voltage. Using a lower cut-off current tends to diminish the battery capacity more over a given number of cycles than using a higher a value for cut-off current.

As shown in FIG. 3, the points at which the charge voltage is changed from the initial charge voltage of 4.2 volts to 4.1 volts, and then from 4.1 volts to 4.0 volts, are labeled as points A and B, respectively. These points at which the charge voltage is changed may be determined in a number of different ways, in accordance with the present invention. The charge voltage may be changed after a predetermined number of charge/discharge cycles has taken place. For example, the charge voltage could be changed from 4.2 volts to 4.1 volts after 150 cycles, and then from 4.1 volts to 4.0 volts after 230 cycles have taken place. In accordance with the present invention, an identification circuit (ID ckt), which may be inside the battery pack or the battery-powered device itself, may be used to store information pertaining to the number of charge (or discharge) cycles that the battery has undergone.

In alternative embodiments of the present invention, instead of relying upon the number of cycles completed, the points A and B could be set to take effect when the capacity of the battery falls to certain predetermined values. For example, the charge voltage could be changed from 4.2 volts to 4.1 volts when the capacity becomes 430 mAh, and then from 4.1 volts to 4.0 volts when the capacity falls to 380 mAh. In some situations, it may be sufficient to simply schedule the points A and B for a particular time and date. For example, if the battery usage conditions are known (e.g., the battery is depleted each day and charged each night) the time for altering the charge voltage for recharging the battery could simply be prescheduled for a certain time and date.

Alternatively, a combination of a measurable quantity (e.g., number of cycles or battery capacity) could be used in conjunction with a predetermined schedule. That is, point A for changing the charging voltage could be set for either when the capacity falls to 430 mAh or a predetermined date, whichever occurs earlier.

Furthermore, it should be appreciated that the points A and B at which the charge voltage is changed need not coincide with a particular fraction of the expected cycle life. For example, the points A and B could be chosen such chat the charge voltage is changed from 4.2 volts to 4.1 volts after 50 cycles, and then from 4.1 volts to 4.0 volts after 500 cycles have taken place, or any other points appropriate for the usage requirements of the battery.

Figure 4:
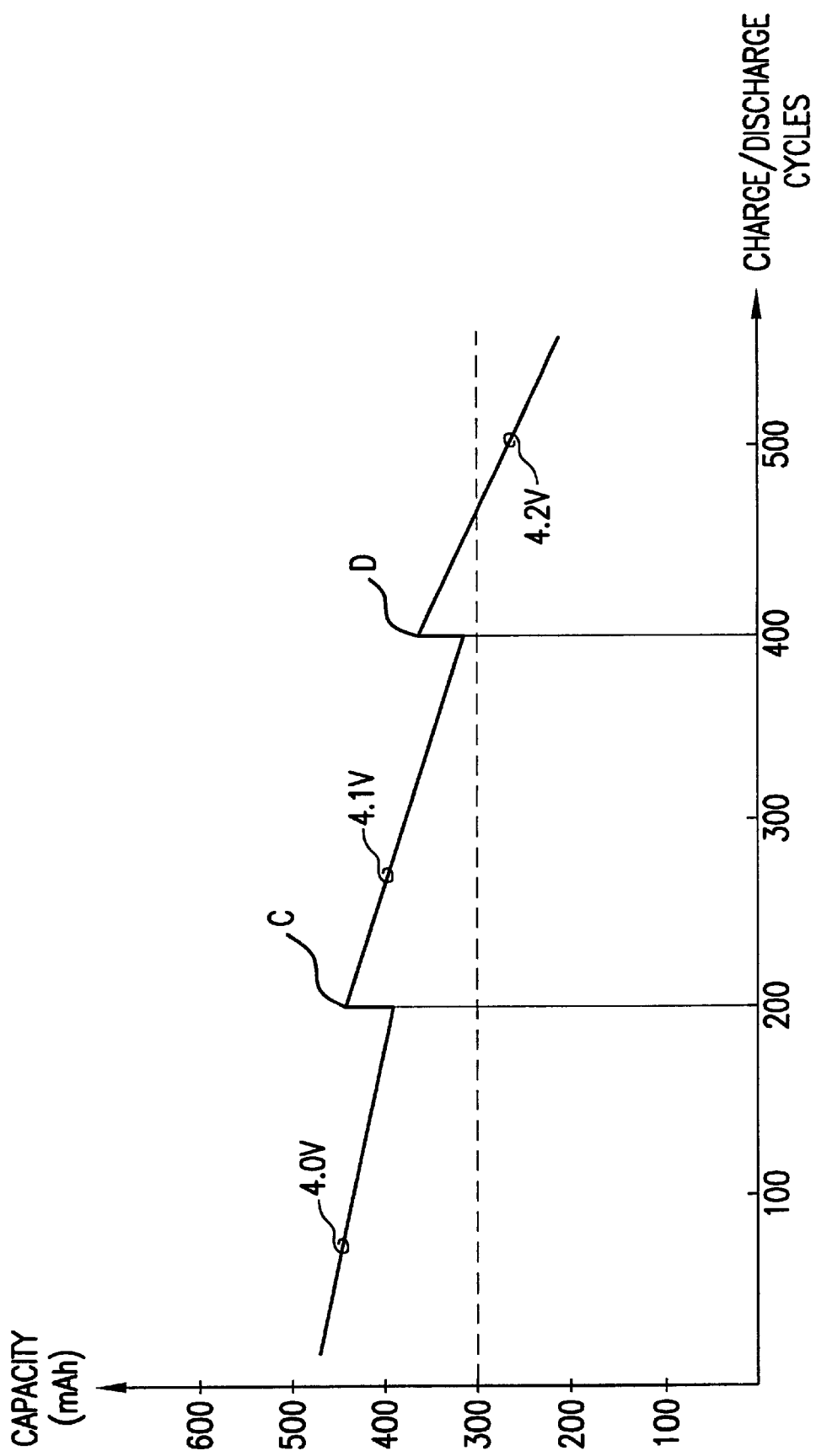
FIG. 4 depicts an exemplary cycle life capacity relationship for a second embodiment of the present invention in which the initial charging voltage is chosen to be lower than the rated charge voltage of the battery.

FIG. 4 depicts an exemplary cycle life capacity relationship for a second embodiment of the present invention. In accordance with this second embodiment, the initial charging voltage is chosen to be lower than the rated charge voltage of the battery. During the cycle life of the battery, the charge voltage is adjusted upward until the rated charge voltage.

As shown in FIG. 4 which depicts capacity over the cycle life of a rechargeable battery, the battery charge voltage is increased from 4.0 volts to 4.1 volts at point C (e.g., 200 cycles). The battery charge voltage is again increased from 4.1 volts to 4.2 volts at point D (e.g., 400 cycles). By incrementally increasing the charge voltage over the cycle life of the battery, the battery capacity is effectively increased to compensate for the diminishing battery capacity due to repeated charging. In this way, the battery capacity remains closer to a constant value over the cycle life of the battery.

In the exemplary second embodiment depicted in FIG. 4, the charge voltage of the battery is initially set to 4.0 volts, and later is adjusted to 4.1 volts, and finally, the charge voltage is adjusted to be 4.2 volts. These charge voltage values and the number of times the charge voltage is changed have been chosen for illustrative purposes. In accordance with the present invention, the charge voltage may be changed many more times in smaller increments. For example, instead of adjusting the charge voltage upward twice by 0.1 volts at points C and D, the charge voltage could be adjusted upward twenty times in 0.01 volt increments. The use of more adjustment increments having smaller values produces a smoother capacity curve over the cycle life of the battery. That is, the "sawtooth" capacity curve of FIG. 4 would be finer in that there would be more adjustments with each upward adjustment (or "sawtooth) being of a smaller increment.

Furthermore, the charge voltage may be adjusted by more than the 0.2 volts (i.e., 4.0 v to 4.2 v) chosen to illustrate this embodiment. The charge voltage could be adjusted across a wider range of charge voltages, such as an initial value of 3.5 volts to a final value of 4.2 volts, or other like range of adjustment.

Figure 5:
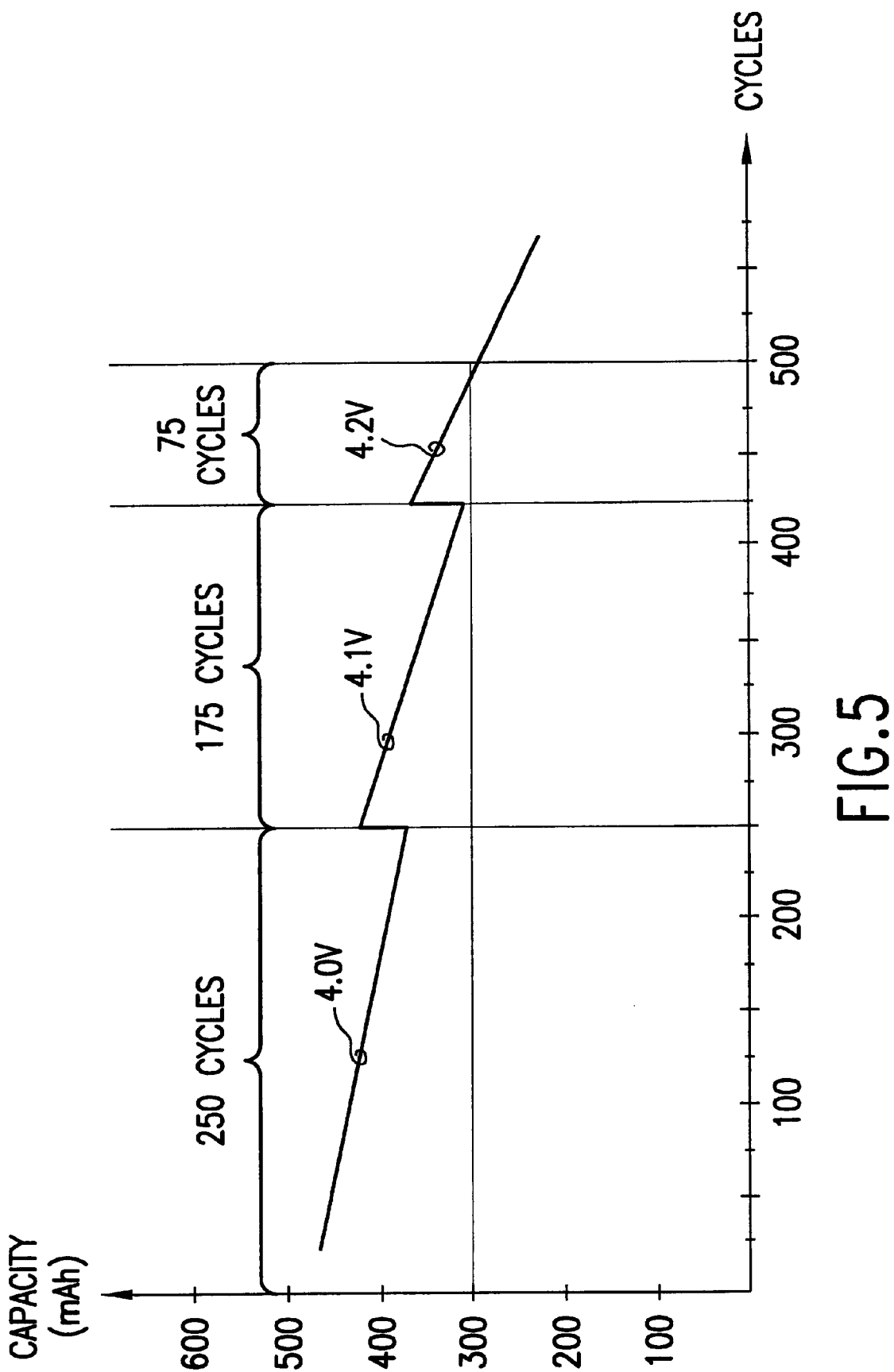
FIG. 5 depicts a variant of the second embodiment in which a battery is charged for more cycles at lower charge voltages than at higher charge voltages.

FIG. 5 depicts a variant of the second embodiment in which a battery is charged for more cycles at lower charge voltages than at higher charge voltages. As discussed above, a battery's capacity tends to diminish more rapidly for higher charge voltages than for lower charge voltages. This can be seen in FIG. 2 by the steeper slope of the capacity curve associated with the 4.2 volt charge voltage, than for the capacity curve associated with the 4.1 volt charge voltage or the capacity curve associated with the 4.0 volt charge voltage. Because the higher charge voltage results in a more rapidly diminishing battery capacity over repeated charging cycles, the charge voltage may need to be adjusted upward after fewer cycles for higher charge voltage values than for lower charge voltages.

In FIG. 5 an exemplary scheme for implementing this variant of the second embodiment is illustrated. The charge voltage, initially set to 4.0 volts, is adjusted upward at 250 cycles to 4.1 volts. The charge voltage is then adjusted upward again at 425 cycles to be 4.2 volts. The cycle life of the battery in this exemplary embodiment ends at 500 cycles when the battery capacity drops below 300 mAh. In accordance with this embodiment, the battery is charged for more cycles at lower charge voltages than at higher charge voltages, since the battery capacity diminishes less rapidly for lower charge voltages than for higher charge voltages. That is, a charge voltage of 4.0 volts is used for the first 250 cycles, a charge voltage of 4.1 volts is used from 250 cycles to 425 cycles (i.e., for 175 cycles), and finally, a charge voltage of 4.2 volts is used from 425 cycles to 500 cycles (i.e., for 75 cycles).

This embodiment may be understood by comparing the slopes of diminishing capacity for the three charge voltages depicted in the figure, and noting the number of cycles for each. The 4.0 volt charge voltage having the least slope (that is, the most level slope in which the capacity diminishes the slowest) is used for the most cycles, 250 cycles. The 4.1 volt charge voltage having an intermediate amount of slope is used for next 175 cycles. The 4.2 volt charge voltage having the most slope (that is, the steepest slope for which the capacity diminishes most rapidly) and is used for the least number of charging cycles, 75 cycles.

In accordance with this embodiment, the number of cycles to be used for each charge voltage may be chosen such that the battery capacity diminishes by the same amount while being charged at each charge voltage. This may be achieved by measuring the battery capacity each time the battery is recharged. When the capacity has diminished by a predetermined amount, the charge voltage may be adjusted accordingly.

Figure 6:
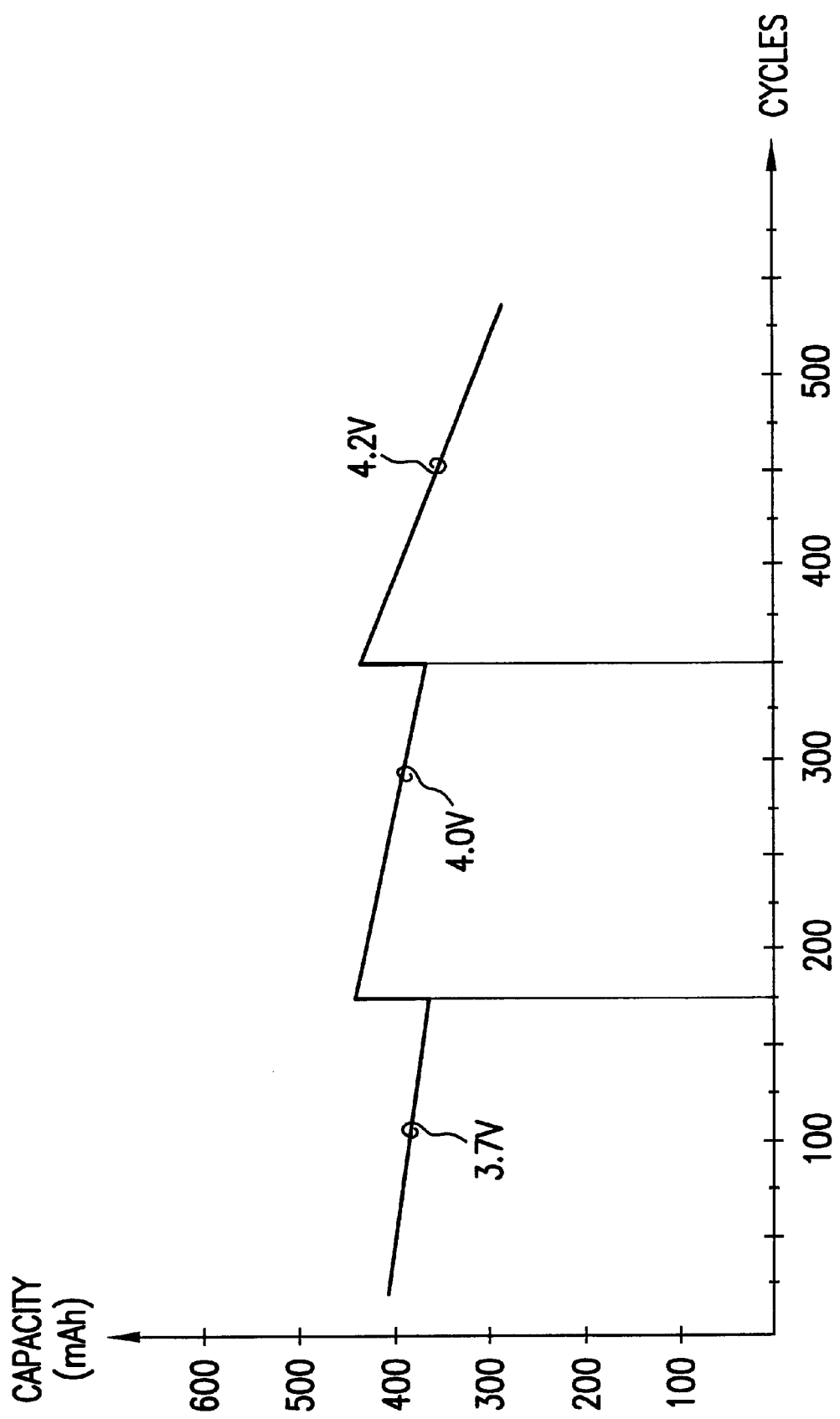
FIG. 6 depicts another variant of the second embodiment wherein the charge voltage at which a battery is charged is adjusted upward by increasing increments during the course of the battery's cycle life.

FIG. 6 depicts another variant of the second embodiment wherein the charge voltage at which a battery is charged is adjusted upward by increasing increments during the course of the battery's cycle life. After a number of cycles an initial charge voltage is increased by an amount to a higher charge voltage. For example, the figure depicts the initial charge voltage of 3.7 volts being increased by an increment of 0.3 volts to 4.0 volts. Later in the cycle life of the battery, the charge voltage is again increased, but by a lesser increment. In the present example of FIG. 6, the charge voltage of 4.0 volts is increased by a lesser increment of 0.2 volts to a 4.2 volt charge voltage.

Features of the embodiment depicted in FIG. 5 and the embodiment depicted in FIG. 6 can be combined. That is, the number of cycles between charge voltage adjustment, as per FIG. 5, can be combined with varied charge voltage increments, as per FIG. 6.

Figure 7:
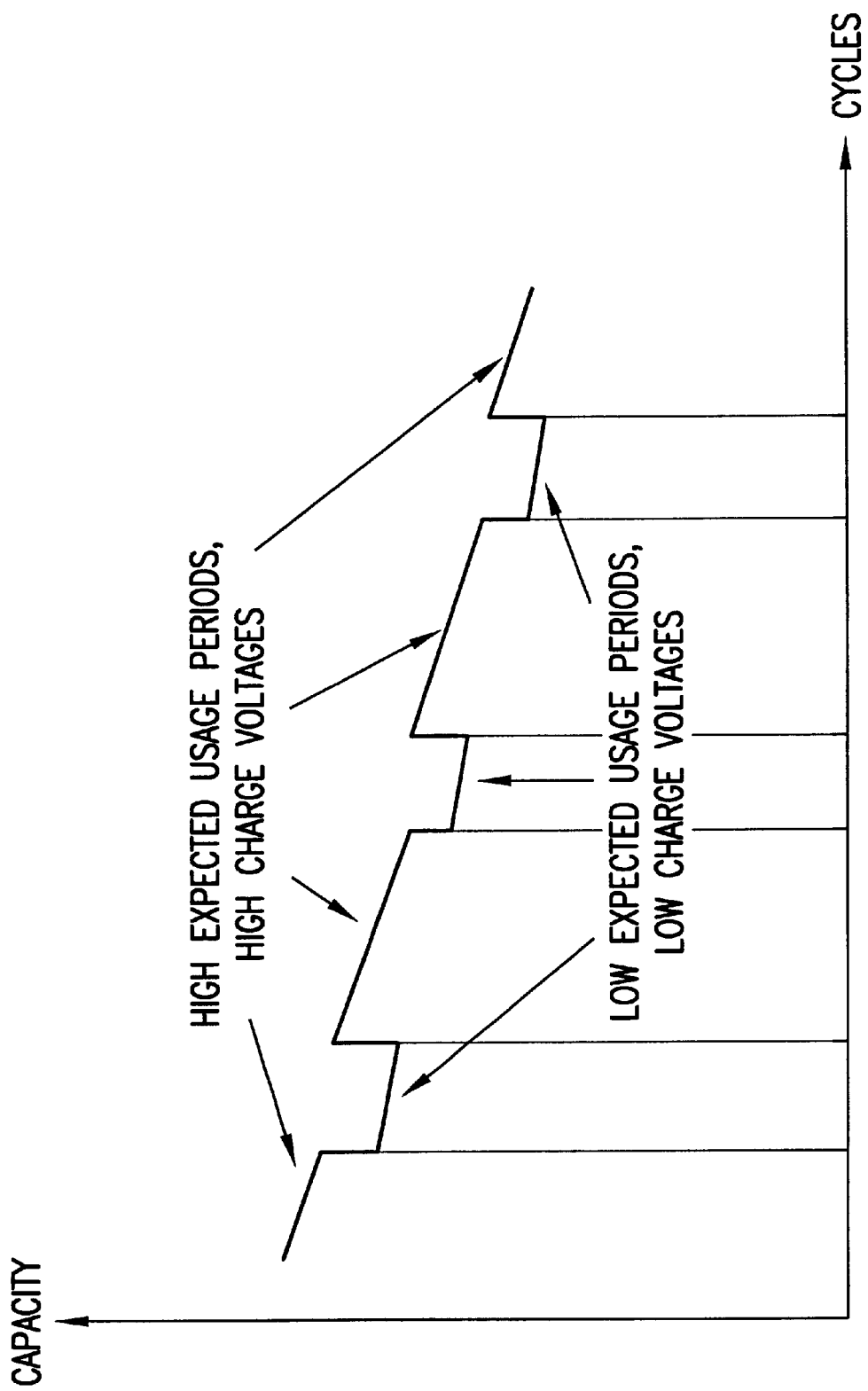
FIG. 7 depicts a third exemplary embodiment of the present invention in which the choice of the charge voltage of the battery is based upon the usage habits or expected usage needs of the device in which the battery resides.

FIG. 7 depicts a third exemplary embodiment of the present invention in which the choice of the charge voltage of the battery is based upon the usage habits or expected usage needs of the device in which the battery resides. Take, for example, the instance in which a battery is used in a portable device such as a laptop computer or communication device in which the device is used each work day, but is not used on the weekends. The user may recharge the battery each night, but a full charge is required only for Monday through Friday. On the weekends, the expected usage drops sufficiently so that a lesser charge will suffice.

In accordance with the present invention, the cycle life may be increased while optimizing the expected usage needs. This may be achieved by charging the battery to a relatively higher charge voltage during the weekdays or periods of expected high usage when the greatest capacity is required, and then charging to a lower charge voltage on the weekends or periods of expected low usage. For example, for the high expected usage periods of Monday through Friday, the battery is charged each previous night using a charge voltage of 4.2 volts. Then, for the low expected usage periods of Saturday and Sunday, the battery is charged using a charge voltage of 4.0 volts. In this way, the battery has a relatively larger charge capacity during the weekdays when the usage is greatest, and a relatively smaller charge capacity on the weekends.

In a variant to this third embodiment, during a first period of the expected cycle life, e.g., 300 cycles, the battery is charged to a higher charge voltage such as 4.1 volts on the weekdays, and is charged to the lowest charge voltage of 4.0 volts on the weekends. In further accordance with this variant, during a second period of the expected cycle life, e.g., from 301 to 600 cycles, the battery is charged to a different high charge voltage, such as 4.2 volts, on the weekdays, but is still charged to the lowest charge voltage of 4.0 volts on the weekends. In other words, the charge voltage is varied from a first relatively high voltage (e.g., 4.1 volts) during periods of expected high usage during a first part of the battery's cycle life, to a second relatively high voltage (e.g., 4.2 volts) during periods of expected high usage during a second part of the battery's cycle life, while having a relatively low charging voltage (e.g., 4.0 volts) during periods of relatively low usage for both the first and second parts of the battery's life.

Whether an upcoming period is high expected usage or low expected usage can be determined in a number of different ways. For example, the user could input the level of expected usage. That is, the user could enter, into either the device which uses the battery or to the battery charger itself, the expected usage (e.g., high, low or medium, or a value representing the expected usage such as a value of from 1 to 10). As a variant to user entry of the expected usage, a default value (e.g., medium usage) could be chosen, and the user only needs to enter a value (e.g., high usage or low usage) if the expected usage is different from the default value.

In accordance with another variant of this embodiment, information is collected to develop an empirical model in a battery usage database of the usage patterns for a particular device. For example, usage information may be collected in a battery usage database over a period of time during which a number of charge/discharge cycles are performed. The battery usage database may be maintained in the portable device, or the information may be communicated from the battery to a remotely maintained battery usage database over the communication channel of the device using the battery (e.g., cellular telephone or pager) or via a wired or wireless line of communication connected to the battery and/or battery charger. In this way, an expected usage profile may be developed, allowing the charge voltages to be tailored in order to match the expected usage profile with the charge voltage used in charging the battery at various times. That is, upon recognizing a usage pattern from the collected usage data, a charge voltage adjustment scheme may be developed to match the battery's capacity to the expected usage. The charge voltage adjustment scheme may be developed by accessing a database of usage information, or expected usage profile, and using the information to charge the battery to higher charge voltages during times of expected high usage and low charge voltages during times of low expected usage. Such usage information may be collected over a period of time, or may be entered or estimated by a user, vendor, or other like source of information. The charge voltage adjustment scheme may be downloaded once into the portable device, may be altered from time to time, or may be centrally controlled for those portable devices which communicate readily (e.g., cellular telephones or pagers).

In the example mentioned above, a user has low usage needs on the weekends, and relatively higher usage needs on the weekdays. Consider the following illustrative example in which the user is a sales person who is based in a particular city and travels via automobile each Wednesday to a distant city, returning home the same day. Evaluating the collected usage date and the user's expected usage profile may reveal that the user's battery powered device (e.g., a laptop computer, cellular telephone or GPS unit) requires the most capacity on Wednesday, the user's day of highway travel. Based upon the user's expected usage profile, a periodic charging scheme could be developed such that 4.0 volts was used on the weekends, 4.2 volts on Wednesdays, and 4.1 volts on the remaining days. This would most closely match the user's battery capacity requirements with the expected usage profile, that is, the expected usage needs.

The expected usage profile could be based upon a number of factors. Schedule (days of the week or seasonal usage) could be used as discussed above, or the expected usage profile could be based upon the occurrence of an event. For example, if the battery is recharged at a location away from the user's home as would occur on a business trip, the capacity requirements could be expected to be high. This could easily be determined using base station proximity for a battery used in a communication device (e.g., cellular telephone, pager).

In accordance with a further variant of the present invention, the charge voltage may be controllably set to either a high charge voltage or a low charge voltage by the user. For example, in any of the foregoing embodiments, a user could override the planned charge voltage and set the charge voltage to a value consistent with the user's expected usage. An embodiment was described above in which a sales person makes a weekly out-of-town trip each Wednesday. In accordance with the present variant, if the sales person's trip was delayed to Thursday, she would simply override the prescheduled lower charge voltage for Thursday, and instead manually set the charge voltage to a higher value.

Figure 8:
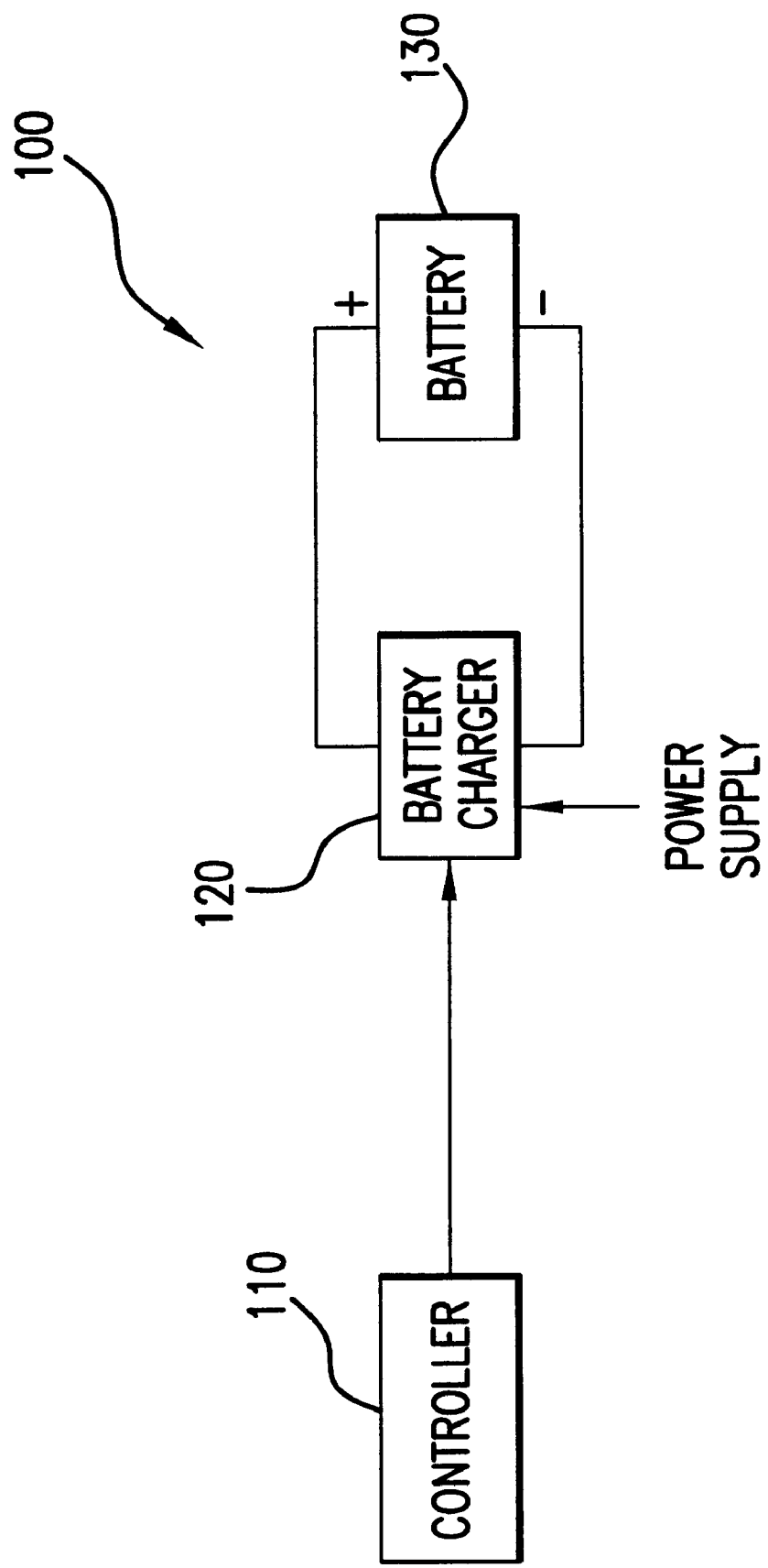
FIG. 8 depicts a system for implementing the present invention.

FIG. 8 depicts a system 100 for implementing the present invention. As shown in the figure, the system 100 has a controller 110 in communication with a battery charger 120. The battery charger 120, which contains battery charging circuitry, is electrically connected to a battery. The controller 110 represents the physical embodiment of the logic for implementing the invention. The controller 110 may be implemented in various forms, as set forth above, and may be located within the battery charger 120, the battery 130 or the device using the battery 130, or may be remotely located at, for example, a central station communicating with a cellular telephone, pager, or like communication device. The battery charger 120 is connected to a power supply such as an electrical wall outlet, the cigarette lighter socket of an automobile, or like source of electrical power. The battery 130 may be a type such as nickel-cadmium (Ni—Cd), sealed lead acid (SLA), nickel-metal-hydride (NiMH), lithium-ion (Li-ion), lithium-polymer (Li-polymer), or any like type of battery which is rechargeable.

Figure 9:
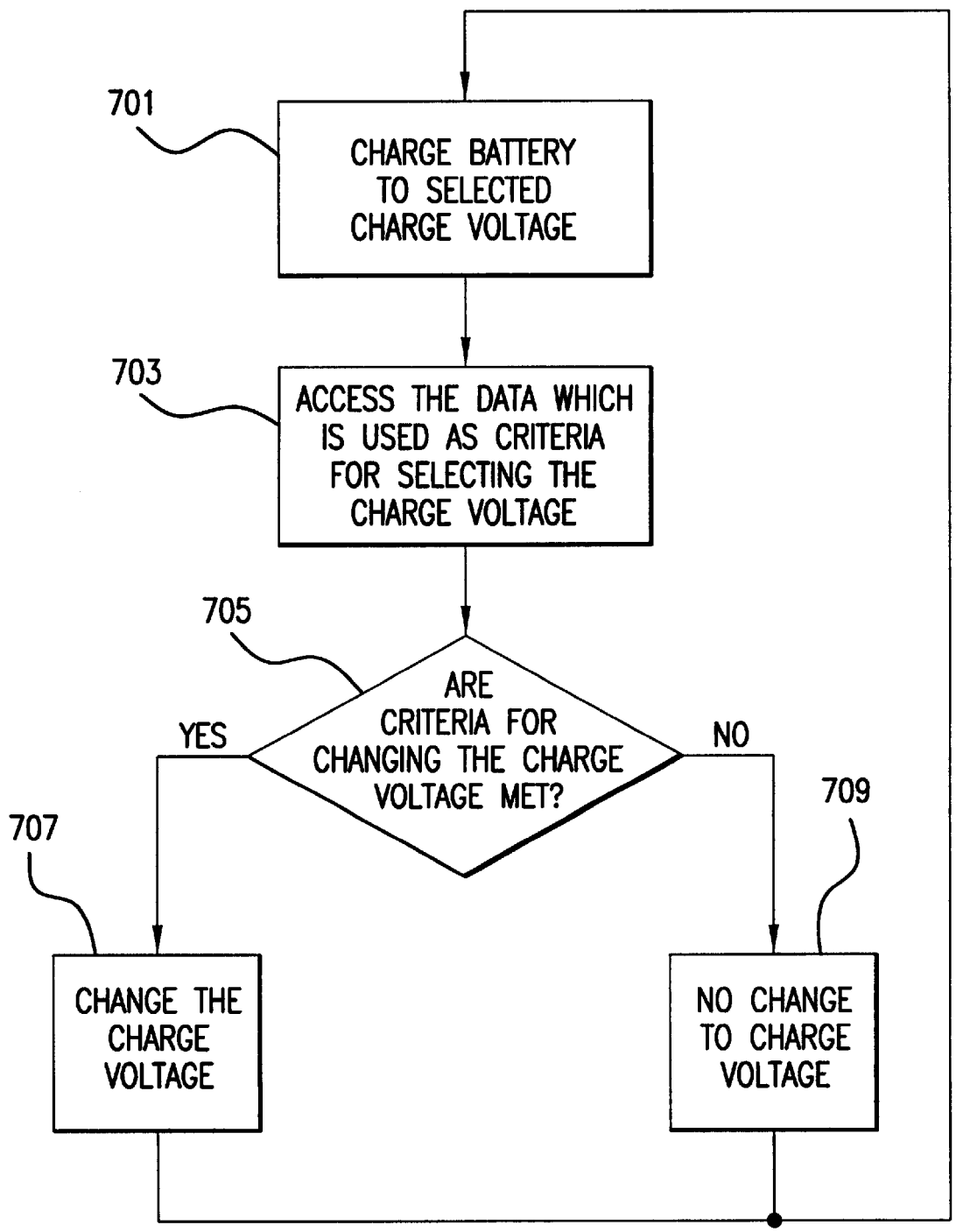
FIG. 9 depicts a method according to the present invention.

FIG. 9 depicts a method according to the present invention. At step 701 the battery is charged to a selected voltage. The selected voltage may initially be the rated charge voltage of the battery, or a lesser voltage, depending upon the particular embodiment.

The method proceeds to step 703 in which data is accessed in order to determine whether the charge voltage is to remain the same or be changed to a different charge voltage. Such data used as criteria for changing the charge voltage may include, for example, the number of cycles completed, the remaining capacity, a predetermined schedule, an indication of an expected high usage period, an input by the user, or like data. Data access may require taking a measurement, reading a counter, communicating with a database, and/or other means of obtaining data as criteria for setting the charge voltage.

Once the charge voltage criteria data has been accessed, the method proceeds via step 705 either to step 707 in which the charge voltage is changed, or to step 709 in which the charge voltage remains the same. At some point during the method, the system may update data regarding the battery such as the number of charge cycles performed or the amount of remaining battery capacity. Following either step 707 or 709, the method returns to step 701 to begin another cycle.

For illustrative purposes, the present invention has been described in terms of using different charge voltages during different periods of the cycle life of a battery. That is, charging a battery using a first charge voltage during a first period, then charging the battery using a second charge voltage during a second period of the battery cycle life. In accordance with alternative embodiments of the present invention, another charge parameter may be changed instead of, or in addition to, changing the charge voltage. For example, a battery may be charged using a first current cut-off during a first period, then charged using a second charge current cut-off during a second period of the battery cycle life, in accordance with the present invention.

The aforementioned embodiments and description of the present invention are intended to be illustrative rather than restrictive. Many variations of implementing the present invention may be derived from the description contained herein by a person skilled in the art. All such variations and modifications are considered to be within the scope and spirit of the present invention, as defined by the following claims.

What is claimed is:

1. A method of charging a battery comprising:
   repeatedly charging the battery using a first value of a charging parameter during a first period within a cycle life of the battery;
   determining an end of said first period; and
   repeatedly charging the battery using a second value of said charging parameter during a second period within said cycle life of the battery, said second value being different from said first value;
   whereby using said first value to charge the battery diminishes a capacity of the battery over a number of cycles by a different amount as compared to using said second value.

2. The method of claim 1, wherein said charging parameter is charge voltage.

3. The method of claim 1, wherein said charging parameter is current cut-off.

4. The method of claim 1, wherein said second value is smaller than said first value.

5. The method of claim 1, wherein said second value is greater than said first value.

6. The method of claim 2, wherein said second value is greater than said first value.

7. The method of claim 6, whereby the second value diminishes the capacity of the battery more rapidly than the first value does.

8. The method of claim 1, whereby the second value diminishes the capacity of the battery more rapidly than the first value does.

9. The method of claim 1, whereby the second value diminishes the capacity of the battery less rapidly than the first value does.

10. The method of claim 1, wherein said first period is determined to end at a point in the cycle life of the battery when the capacity of the battery has been diminished by a predetermined amount.

11. The method of claim 1, wherein said first period is determined to end after a predetermined number of charging cycles have taken place.

12. The method of claim 1, wherein the end of said first period is determined in accordance with a predetermined calendar-based schedule.

13. A method of charging a battery which is repeatedly charged and discharged, the method comprising:
   determining a first number of cycles in which a capacity of said battery diminishes by a first amount using a first value of a charging parameter;
   determining a second number of cycles in which the capacity of said battery diminishes by a second amount using a second value of said charging parameter;
   repeatedly charging the battery using said first value for said first number of cycles; and
   repeatedly charging the battery using said second value after said first number of cycles;
   wherein said first value is different than said second value.

14. The method of claim 13, wherein said charging parameter is charge voltage.

15. The method of claim 13, wherein said charging parameter is current cut-off.

16. The method of claim 13 wherein said first value is greater than said second value.

17. The method of claim 13 wherein said first value is smaller than said second value.

18. The method of claim 13 further comprising a step of:
   repeatedly charging the battery using a third value after said battery has been charged a first number of cycles using said first value and a second number of cycles using said second value;
   wherein said third value is different than either said first value or said second value.

19. A method of charging a rechargeable battery of a device, the method comprising:
   accessing an expected usage profile for the device, the expected usage profile identifying periods of expected high usage and periods of expected low usage;
   developing a charge voltage adjustment scheme based upon the expected usage profile;
   charging the battery to a first charge voltage during periods of expected high usage; and
   charging the battery to a second charge voltage during periods of expected low usage;
   wherein said first charge voltage is a greater voltage than said second charge voltage.

20. The method of claim 19 wherein the device is a communication device and the step of accessing further comprises:
   establishing a communication link via the device to a database containing the expected usage profile.

21. A method of charging a rechargeable battery of a device, the method comprising:
   accessing an expected usage profile for the device, the expected usage profile identifying periods of expected high usage and periods of expected low usage;
   developing a charge voltage adjustment scheme based upon the expected usage profile;
   charging the battery using a first current cut-off during periods of expected high usage; and
   charging the battery using a second current cut-off during periods of expected low usage;
   wherein said first current cut-off is at a smaller current value than said second current cut-off.

22. The method of claim 21 wherein the device is a communication device and the step of accessing further comprises:
   establishing a communication link via the device to a database containing the expected usage profile.

23. A battery charging system comprising:
   a variable charge voltage battery charger; and
   charge voltage decision logic that determines whether a battery is to be charged using a first charge voltage or a second charge voltage;
   wherein said charge voltage decision logic controls the battery charger to repeatedly charge said battery using the first charge voltage during a first period and controls the battery charger to repeatedly charge said battery using the second charge voltage during a second period, said second charge voltage being different from said first charge voltage whereby the second charge voltage diminishes a capacity of the battery at a different rate than the first charge voltage.

24. A battery charging system comprising:
   a variable current cut-off battery charger; and
   current cut-off decision logic that determines whether a battery is to be charged using a first current cut-off or a second current cut-off;
   wherein said charge voltage decision logic controls the battery charger to repeatedly charge said battery using the first current cut-off during a first period and controls the battery charger to repeatedly charge said battery using the second current cut-off during a second period, said second current cut-off being different from said first current cut-off whereby the second current cut-off diminishes a capacity of the battery at a different rate than the first current cut-off.

25. A battery charging system comprising:
   a charge controller;
   a battery charger;
   a capacity measurement section; and
   logic that repeatedly charges a battery using a first value of a charging parameter until said capacity measurement section determines that battery capacity has diminished by a first amount, then repeatedly charges the battery using a second value of said charging parameter, the first value being different from said second value.

26. The method of claim 25, wherein said charging parameter is charge voltage.

27. The method of claim 25, wherein said charging parameter is current cut-off.

28. A battery charging apparatus for charging a rechargeable battery of a device, the apparatus comprising:
   battery charging circuitry;
   a controller; and
   battery usage database containing an expected usage profile for the device;
   wherein the controller accesses the expected usage profile for the device, develops a charging parameter adjustment scheme based upon the expected usage profile, and causes the battery charging circuitry to charge the battery using a first value of a charging parameter during periods of expected high usage and charge the battery using a second value of said charging parameter during periods of expected low usage.

29. The method of claim 28, wherein said charging parameter is charge voltage.

30. The method of claim 28, wherein said charging parameter is current cut-off.

31. The apparatus of claim 28 wherein the device is a communication device and the controller accesses the battery usage database by establishing a communication link via the communication device.

* * * * *